United States Patent
Ichikawa et al.

(10) Patent No.: US 8,906,508 B2
(45) Date of Patent: Dec. 9, 2014

(54) METHOD OF TOUGHENING THERMOPLASTIC POLYURETHANE AND ARTICLES COMPRISING TOUGHENED THERMOPLASTIC POLYURETHANE

(75) Inventors: Yasushi Ichikawa, Tualatin, OR (US); Thomas J. Kennedy, III, Wilbraham, MA (US)

(73) Assignee: NIKE, Inc., Beaverton, OR (US)

( * ) Notice: Subject to any disclaimer, the term of this patent is extended or adjusted under 35 U.S.C. 154(b) by 94 days.

(21) Appl. No.: 13/483,791

(22) Filed: May 30, 2012

(65) Prior Publication Data

US 2013/0323512 A1    Dec. 5, 2013

(51) Int. Cl.
*B32B 27/40*    (2006.01)
*B05D 3/02*    (2006.01)
*B05D 7/02*    (2006.01)

(52) U.S. Cl.
USPC ..................................... 428/423.3; 427/379

(58) Field of Classification Search
USPC ..................................... 428/423.3; 427/379
See application file for complete search history.

(56) References Cited

U.S. PATENT DOCUMENTS

| | | |
|---|---|---|
| 3,062,722 A | 11/1962 | Domenico |
| 3,395,109 A | 7/1968 | Molitor et al. |
| 3,454,280 A | 7/1969 | Harrison et al. |
| 3,647,221 A | 3/1972 | Holley |
| 3,819,768 A | 6/1974 | Molitor |
| 1,989,568 A | 11/1976 | Isaac |
| 4,123,061 A | 10/1978 | Dusbiber |
| 4,248,432 A | 2/1981 | Hewitt et al. |
| 4,323,247 A | 4/1982 | Keches et al. |
| 4,442,282 A | 4/1984 | Kolycheck |
| 4,526,375 A | 7/1985 | Nakade |
| 4,674,751 A | 6/1987 | Molitor et al. |
| 4,884,814 A | 12/1989 | Sullivan |
| 4,911,451 A | 3/1990 | Sullivan et al. |
| 4,980,445 A | 12/1990 | Van Der Wal et al. |
| 5,334,673 A | 8/1994 | Wu |
| 5,409,233 A | 4/1995 | Kennedy, III |
| 5,459,220 A | 10/1995 | Kennedy, III |
| 5,599,874 A | 2/1997 | Singer et al. |
| 5,697,715 A | 12/1997 | Kuroda et al. |
| 5,885,172 A | 3/1999 | Hebert et al. |
| 5,929,181 A | 7/1999 | Makovetsky et al. |
| 5,929,189 A | 7/1999 | Ichikawa et al. |
| 6,063,859 A | 5/2000 | Yamamoto et al. |
| 6,123,628 A | 9/2000 | Ichikawa et al. |
| 6,458,307 B2 | 10/2002 | Inoue et al. |
| 6,582,325 B1 | 6/2003 | Ichikawa et al. |
| 6,642,314 B2 | 11/2003 | Sone et al. |
| 6,663,507 B1 | 12/2003 | Watanabe |

(Continued)

FOREIGN PATENT DOCUMENTS

| | | |
|---|---|---|
| JP | 09140833 | 6/1997 |
| JP | 2005304721 | 11/2005 |
| KR | 2009077543 | 7/2009 |

*Primary Examiner* — Thao T. Tran
(74) *Attorney, Agent, or Firm* — Honigman Miller Schwartz and Cohn, LLP; Anna M. Budde; Johnathan P. O'Brien

(57) ABSTRACT

A method of toughening thermoplastic polyurethane (TPU). The TPU is dipped into a urethane solution having a penetrating agent, then heated and dried for a period sufficient to toughen the surface. Also, articles such as golf balls having a toughened thermoplastic polyurethane surface. The toughened thermoplastic polyurethane surface is more scuff-resistant and has a greater strain-rate shear resistance than the TPU.

5 Claims, 7 Drawing Sheets

(56) References Cited

U.S. PATENT DOCUMENTS

| | | |
|---|---|---|
| 6,729,975 B2 | 5/2004 | Inoue et al. |
| 6,746,347 B2 | 6/2004 | Higuchi et al. |
| 6,747,100 B2 | 6/2004 | Ichikawa et al. |
| 6,750,299 B2 | 6/2004 | Ichikawa et al. |
| 6,764,415 B2 | 7/2004 | Ichikawa et al. |
| 6,806,323 B2 | 10/2004 | Ichikawa et al. |
| 6,837,804 B2 | 1/2005 | Watanabe et al. |
| 6,846,250 B2 | 1/2005 | Higuchi et al. |
| 6,855,076 B2 | 2/2005 | Matroni et al. |
| 6,899,641 B2 | 5/2005 | Watanabe |
| 6,935,970 B2 | 8/2005 | Matroni et al. |
| 6,939,251 B2 | 9/2005 | Ichikawa et al. |
| 6,992,145 B2 | 1/2006 | Ichikawa et al. |
| 7,008,333 B2 | 3/2006 | Takesue et al. |
| 7,090,799 B2 | 8/2006 | Takesue et al. |
| 7,101,934 B2 | 9/2006 | Shimura et al. |
| 7,160,208 B2 | 1/2007 | Watanabe |
| 7,238,123 B2 | 7/2007 | Watanabe |
| 7,278,929 B2 | 10/2007 | Umezawa et al. |
| 7,387,581 B2 | 6/2008 | Higuchi et al. |
| 7,388,066 B2 | 6/2008 | Nagasawa et al. |
| 7,479,533 B2 | 1/2009 | Nagasawa et al. |
| 7,524,251 B2 | 4/2009 | Melanson et al. |
| 7,591,968 B2 | 9/2009 | Melanson et al. |
| 7,601,290 B2 | 10/2009 | Nagasawa et al. |
| 7,604,552 B2 | 10/2009 | Melanson et al. |
| 7,625,300 B2 | 12/2009 | Melanson et al. |
| 7,641,841 B2 | 1/2010 | Melanson et al. |
| 7,794,641 B2 | 9/2010 | Nagasawa et al. |
| 2007/0222120 A1* | 9/2007 | Melanson et al. ............ 264/485 |
| 2010/0056299 A1 | 3/2010 | Egashira et al. |
| 2011/0081492 A1 | 4/2011 | Michalewich et al. |
| 2011/0177883 A1 | 7/2011 | Tutmark |
| 2012/0021850 A1* | 1/2012 | Kennedy ..................... 473/371 |
| 2012/0270682 A1* | 10/2012 | Fitchett et al. ............... 473/378 |

* cited by examiner

METHOD OF TOUGHENING THERMOPLASTIC POLYURETHANE AND ARTICLES COMPRISING TOUGHENED THERMOPLASTIC POLYURETHANE

BACKGROUND OF THE INVENTION

1. Field of the Invention

The present disclosure relates to a method of toughening thermoplastic polyurethane. The present disclosure also relates to articles, and particularly to golf balls, having a toughened thermoplastic polyurethane outer surface.

2. Description of Related Art

Golf ball covers are generally divided into two types: thermoplastic covers and thermoset covers. Thermoplastic polymer materials may be reversibly melted, and so may be used in a variety of manufacturing techniques, such as compression molding, that take advantage of this property. On the other hand, thermoset polymer materials are generally formed by mixing two or more components to form a cured polymer material that cannot be re-melted or re-worked. Each type of polymer material present advantages and disadvantages when used to manufacture golf balls.

Thermoplastic materials for golf ball covers can be usually include ionomer resin, highly neutralized acid polymer composition, polyamide resin, polyester resin, polyurethane resin, and mixtures thereof. Among these, ionomer resin and polyurethane resin are popular materials for golf ball covers.

Ionomer resins, such as Surlyn® products (commercially available from E. I. DuPont de Nemours and Company), have conventionally been used for golf ball covers. For example, Dunlop Rubber Company obtained the first patent on the use of Surlyn® for the cover of a golf ball, U.S. Pat. No. 3,454,280 issued Jul. 8, 1969. Since then, there have been a number of disclosures on the use of ionomer resins in the cover composition of a golf ball, for example, U.S. Pat. Nos. 3,819,768, 4,323,247, 4,526,375, 4,884,814, and 4,911,451.

However, ionomer resin covered golf balls suffer from the problem that the cover surface may be scraped off by grooves on a clubface during repeated shots, particularly with irons. In other words, ionomer covers have poor scuff resistance. Also, ionomer covered balls usually have inferior spin and feel properties as compared to balata rubber or polyurethane covered balls. The use of softer ionomer resins for the cover will improve spin and feel to some extent, but will also compromise the resilience of the golf balls because such balls usually have a lower coefficient of restitution (C.O.R.). Furthermore, the scuff resistance of such softer ionomer covers is often still not satisfactory.

Thermoplastic polyurethane elastomers may also be used as the cover material, as described in (for example) U.S. Pat. Nos. 3,395,109, 4,248,432, and 4,442,282. However, the thermoplastic polyurethane elastomers disclosed therein do not satisfy all the requirements of moldability, hitting feel, control, resilience, and scuff resistance upon iron shots.

US Patent Application Publication No. 2011/0081492 (the '492 publication) disclosed a method of curing polyurethane composition for use in constructing golf balls by i) mixing isocyanate and polyol compounds to produce a polyurethane prepolymer; ii) chemically-curing the prepolymer by reacting it with a hydroxyl-terminated curing agent at a stoichiometric ratio of isocyanate groups to hydroxyl groups of at least 1.20:1.00 to form a composition; iii) applying the composition over the core and allowing it to partially-cure; and iv) moisture-curing the composition to form a fully-cured cover layer comprising a polyurethane/urea composition.

On the other hand, thermoset polymer materials such as polyurethane elastomers, polyamide elastomers, polyurea elastomers, diene-containing polymer, cross-linked metallocene catalyzed polyolefin, and silicone, may also be used to manufacture golf balls. Among these materials, thermoset polyurethane elastomers are popular.

Many attempts, such as are described in U.S. Pat. Nos. 3,989,568, 4,123,061, 5,334,673, and 5,885,172, have been made to use thermoset polyurethane elastomers as a substitute for balata rubber and ionomer resins. Thermoset polyurethane elastomers are relatively inexpensive and offer good hitting feel and good scuff resistance. Particularly, thermoset polyurethane elastomers may present improvements in the scuff resistance as compared to softened ionomer resin blends. However, thermoset materials require complex manufacturing processes to introduce the raw material and then effect a curing reaction, which causes the manufacturing process to be less efficient. Also, thermoset materials are difficult or impossible to recycle.

Thermoplastic polyurethane often is chosen to serve as the outer surface of an article because thermoplastic polyurethane has many desirable properties. In particular, use of thermoplastic polyurethane in golf balls as outer covers layers is because the cover hardness and spin rate can be varied to suit the user. Further, thermoplastic polyurethane is easily processed by injection molding or other processes.

However, thermoplastic polyurethane does not have high strain rate shear resistance. Therefore, when a golf ball having an outer surface comprising thermoplastic polyurethane is struck at an oblique angle, particularly with a highly-lofted club such as a wedge, the surface often fails. Failure mode is made evident by corrugations, or 'hairs,' sticking up from the golf ball.

Scuff-resistant, durable materials also are important in other technologies. For example, articles such as livestock identity tags and sports balls of many types require a durable, scuff-resistant surface.

Accordingly, for the foregoing reasons, there is a need in the art for a system and method that addresses the shortcomings of the prior art discussed above.

SUMMARY OF THE INVENTION

In one aspect, this disclosure relates to a method of toughening thermoplastic polyurethane (TPU). The TPU is dipped into a solution comprising urethane and a penetrating agent, then heated and dried for a period sufficient to toughen the surface. The thermoplastic polyurethane in the solution is infused into the surface of the TPU substrate. Then, the polyurethane is cured to toughen the TPU surface.

In another aspect, this disclosure relates to articles having a toughened thermoplastic polyurethane surface.

In another aspect, the disclosure relates to golf balls having a toughened thermoplastic polyurethane surface.

In accordance with this disclosure, a toughened thermoplastic polyurethane surface is more scuff-resistant and has a greater strain-rate shear resistance than the thermoplastic polyurethane substrate, i.e., the TPU.

BRIEF DESCRIPTION OF THE DRAWINGS

The invention can be better understood with reference to the following drawing and description. The components in the figure are not necessarily to scale, emphasis instead being placed upon illustrating the principles of the invention. Moreover, in the figure, like reference numerals designate corresponding parts throughout the different views.

DETAILED DESCRIPTION

Figure 1:
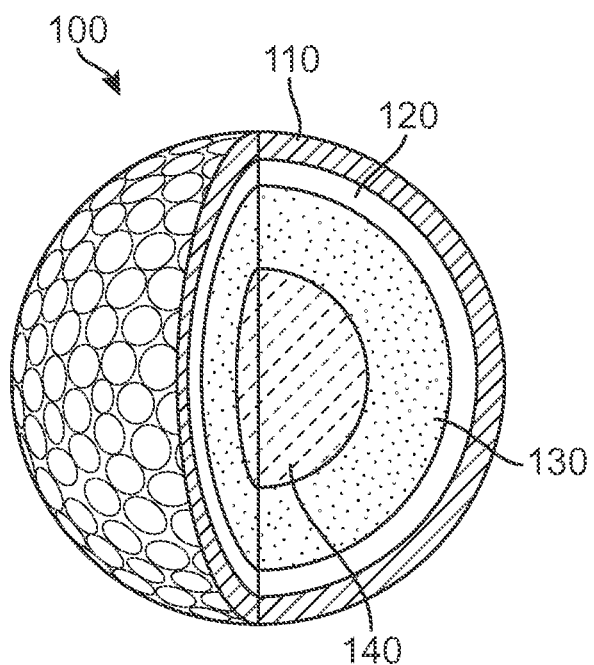
FIG. 1 shows a representative four-piece golf ball in accordance with this disclosure, the golf ball having an inner core layer, an outer core layer, an inner cover layer, and an outer cover layer.

Generally, this disclosure provides a toughened thermoplastic polyurethane surface on a TPU substrate, and a method of making that that toughened surface. This disclosure also provides a method of making articles, particularly golf balls, having a toughened thermoplastic polyurethane surface, by infusing a solution of thermoplastic polyurethane into the TPU and drying and curing the polyurethane. In particular, in embodiments relating to golf balls, the outer cover layer is made from thermoplastic polyurethane, which is dipped into a thermoset aromatic polyurethane solution, dried, and cured to form the toughened surface. As a result of this treatment, the strain-rate shear resistance of a golf ball's outer cover, or of the outer surface of any article, may be greatly improved. This improvement typically is made manifest, or is illustrated, by scuff resistance. The polyurethane solution also may be a thermoset aliphatic polyurethane solution.

Low strain-rate shear resistance is associated with low scuff resistance, which manifests itself as corrugations or 'hairs' that stick up from the golf ball, or any other article subjected to strain rate higher than the material can accommodate. For example, a golf ball having insufficient strain-rate shear resistance is likely to have corrugations or 'hairs' on the surface of the golf ball after it has been struck with a golf club, particularly with an iron or another club that has a high loft angle.

The aspects of this disclosure that relate to use of the toughened thermoplastic polyurethane in a golf ball may be applied to any golf ball precursor having any number of layers or pieces. In particular, the golf ball should have a thermoplastic polyurethane cover layer. The construction of a golf ball made according to the present method is not limited to the embodiments mentioned with specificity herein. For example, a golf ball in accordance with this disclosure may generally take any construction, such as a conforming or non-conforming construction. Conforming golf balls are golf balls which meet the Rules of Golf as approved by the United States Golf Association (USGA).

In particular, for example, a golf ball having a thermoplastic polyurethane outer cover layer may be a single piece, or may comprise multiple layers, or pieces. For example, the golf ball may have an internal construction comprising a core, intermediate layers, and cover layers. The core may comprise an inner and other core layers. Also, there may be one or more intermediate layers, sometimes called mantle layers, and the cover also may comprise many layers.

Further, the inner core may comprise a thermoplastic material, a thermoset material, or a combination of both. Indeed, any interior layer may be a thermoplastic material, a thermoset material, or a combination thereof. Typically, a golf ball would have a dimple pattern in at least the outer cover layer. For convenience, however, the disclosure will be directed to a four-piece ball having a thermoplastic polyurethane cover layer.

FIG. 1 shows a golf ball 100 made in accordance with the method of the present invention. Golf ball 100 includes an inner core layer 140, an outer core layer 130 substantially surrounding inner core layer 140, an inner cover layer 120 substantially surrounding outer core layer 130, and an outer cover layer 110 substantially surrounding inner cover layer 120 wherein outer cover 110 comprises the toughened thermoplastic polyurethane disclosed herein.

As used herein, unless otherwise stated, compression deformation, hardness, COR, flexural modulus, and Vicat softening temperature are measured as follows:

A. Compression deformation: The compression deformation herein indicates the deformation amount of the ball, or any portion thereof, under a force; specifically, when the force is increased to become 130 kg from 10 kg, the deformation amount of the ball or portion thereof under the force of 130 kg reduced by the deformation amount of the ball or portion thereof under the force of 10 kg is the compression deformation value of the ball or portion thereof.

B. Hardness: Hardness of a material is measured on a plaque in accordance with ASTM D-2240. Hardness of a golf ball layer is measured generally in accordance with ASTM D-2240, but is measured on the land area of a curved surface of a molded ball.

C. Method of measuring COR: A golf ball for test is fired by an air cannon at an initial velocity of 40 m/sec, and a speed monitoring device is located over a distance of 0.6 to 0.9 meters from the cannon. The golf ball strikes a steel plate positioned about 1.2 meters away from the air cannon and rebounds through the speed-monitoring device. The return velocity divided by the initial velocity is the COR.

D. Flexural modulus: Measured in accordance with ASTM D-790.

E. Vicat softening temperature: Measured in accordance with ASTM D-1525.

As the skilled practitioner recognizes, thermoplastic polyurethanes are generally made up of (1) a long chain polyol, (2) a relatively short chain extender, and (3) a diisocyanate. There are few limitations on the polyols, chain extenders, and diisocyanates that will form thermoplastic polyurethane generally suitable for forming the cover layer on a golf ball. However, thermoplastic polyurethanes often lack strain resistance and are prone to scuffing. Thus, a suitable thermoplastic polyurethane, and the component parts thereof, are limited only in the sense that the thermoplastic polyurethane will have a set of properties and characteristics selected by the manufacturer to provide certain performance. For example, thermoplastic polyurethane often is used as the outer cover layer on a golf ball because one can, by judicious selection of reactants, produce variation in cover hardness and spin rate. The method and resultant toughened thermoplastic polyurethane disclosed herein will improve the strain resistance, as manifested in improved scuff resistance, of the thermoplastic polyurethane of the outer surface of the article.

One component of a thermoplastic polyurethane is a long-chain polyol. The long chain polyol ("the polyol") may generally be a polyester polyol or a polyether polyol. Accordingly, the thermoplastic polyurethane may be either general type of polyurethane: a polyether-based polyurethane or a polyester-based polyurethane, or mixtures thereof.

The long chain polyol typically may be a polyhydroxy compound having a typical molecular weight between 250 and 4,000. Suitable long chain polyols may generally include linear polyesters, polyethers, polycarbonates, polylactones (e.g., ε-caprolactone), and mixtures thereof. In addition to polyols having hydroxyl terminal groups, the polyol may include carboxyl, amino, or mercapto terminal groups.

Polyester polyols are produced by the reaction of dicarboxylic acids and diols or an esterifiable derivative thereof. Examples of suitable dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. Examples of suitable diols include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, and the like. Both of the dicarboxylic acids and diols can be used individually or in mixtures to make specific polyesters in the practice applications.

Polyether polyols are prepared by the ring-opening addition polymerization of an alkylene oxide with an initiator of a polyhydric alcohol. Examples of suitable polyether polyols are polypropylene glycol (PPG), polyethylene glycol (PEG), polytetramethylene ether glycol (PTMEG). Block copolymers such as combinations of polyoxypropylene and polyoxyethylene glycols, poly-1,2-oxybutylene and polyoxyethylene glycols, polytetramethylene-etherglycol (PTMEG), poly-1,4-tetramethylene and polyoxyethylene glycols are also typically used in the present invention.

Polycarbonate polyols are made through a condensation reaction of diols with phosgene, chloroformic acid ester, dialkyl carbonate or diallyl carbonate. Examples of diols in the suitable polycarbonate polyols of the cross-linked thermoplastic polyurethane elastomers are ethanediol, diethylene glycol, 1,3-butanediol, 1,4-butanediol, 1,6-hexanediol, neopentylglycol, and 1,5-pentanediol.

TPU also typically contains a relatively short chain extender. Suitable short chain extenders have at least two reaction sites with isocyanates, i.e., has two moieties that each react with isocyanate, and having a molecular weight of less than about 450.

Suitable chain extenders may include the common diols, such as ethylene glycol, diethylene glycol, triethylene glycol, propylene glycol, dipropylene glycol, tripropylene glycol, 1,3-propanediol, 1,4-butanediol, 1,6-hexanediol, 1,10-decanediol, neopentyl glycol, dihydroxyethoxy hydroquinone, 1,4-cyclo-hexanedimethanol, 1,4-dihydroxycyclohexane, and the like. Minor amounts of cross-linking agents such as glycerine, trimethylolpropane, diethanolamine, and triethanolamine may be used in conjunction with the diol chain extenders.

The diisocyanate component typically is an organic isocyanate. The isocyanate may include any of the known aromatic, aliphatic, and cycloaliphatic di- or poly-isocyanates. Examples of suitable isocyanates include: 2,2'-, 2,4'-, and particularly 4,4'-diphenylmethane diisocyanate (MDI), and isomeric mixtures thereof; polyphenylene polymethylene polyisocyanates (poly-MDI, PMDI); 2,4- and 2,6-toluene diisocyanates, and isomeric mixtures thereof such as an 80:20 mixture of the 2,4- and 2,6-isomers (TDI); the saturated, isophorone diisocyanate; 1,4-diisocyanatobutane; 1,5-diisocyanatopentane; 1,6-diisocyanatohexane; 1,4-cyclohexane diisocyanate (HDI); cycloaliphatic analogs of PMDI; and the like. Also, biurets, such as polyisocyanates based on HDI, also are suitable.

The skilled practitioner recognizes that the stoichiometric ratio of isocyanate moieties to hydroxyl moieties in TPU, also known as the stoichiometric NCO index, is 1:1. However, for various reasons, including completeness of reaction, avoidance of deleterious residual materials in product, avoiding waste, and the like, the stoichiometric ratio often is not used. Typically, TPU products have an NCO index, often called simply the index, of at least about 0.95, and more typically between about 0.98 and 1.50. Quantities of isocyanate moieties yielding an index above 1.50 typically provide no benefit.

The TPU may be cross-linked in any way known to the skilled practitioner.

The skilled practitioner recognizes that, for each of the above listed reactants, any particular embodiment of a specific reactant may be mixed and matched with any other specific embodiment of another reactant according to the general formulation for thermoplastic polyurethane. Furthermore, any reactant may generally be used in combination with other reactants of the same type, such that any list herein may be assumed to include mixtures thereof, unless otherwise specified.

For example, the skilled practitioner recognizes that the reaction product of isocyanate and hydroxyl moieties is a urethane. However, isocyanate also is reactive with amines, with the reaction product forming a urea. Therefore, in addition to the common diol chain extenders, diamines and amino alcohols may also be used to make thermoplastic polyurethane. Examples of suitable diamines include aliphatic, cycloaliphatic, or aromatic diamines. In particular, a diamine chain extender may be ethylene diamine, hexamethylene diamine, 1,4-cyclohexylene diamine, benzidine, toluene diamine, diaminodiphenyl methane, the isomers of phenylene diamine or hydrazine. Aromatic amines may also be used, such as MOCA (4,4'-methylene-bis-o-chloroaniline), M-CDEA (4,4'-methylenebis(3-chloro-2,6-diethyl-aniline)). Examples of suitable amino alcohols, which can result in both urea and urethane structures, include ethanol amine, N-methylethanolamine, N-butylethanolamine, N-oleylethanolamine, N-cyclohexylisopropanolamine, and the like. Mixtures of various types of chain extenders may also be used to form the cross-linked thermoplastic polyurethane.

Optionally, the thermoplastic polyurethane may include further components such as fillers and/or additives. Fillers and additives may be used based on any of a variety of desired characteristics, such as enhancement of physical properties, UV light resistance, and other properties. For example, to improve UV light resistance, the thermoplastic polyurethane may include at least one light stabilizer. Light stabilizers may include hindered amines, UV stabilizers, or a mixture thereof.

Inorganic or organic fillers can be also added to the thermoplastic polyurethane. Suitable inorganic fillers may include silicate minerals, metal oxides, metal salts, clays, metal silicates, glass fibers, natural fibrous minerals, synthetic fibrous minerals, or a mixture thereof. Suitable organic fillers may include carbon black, fullerene and/or carbon nanotubes, melamine colophony, cellulose fibers, polyamide fibers, polyacrylonitrile fibers, polyurethane fibers, polyester fibers based on aromatic and/aliphatic dicarboxylic acid esters, carbon fibers or a mixture thereof. The inorganic and organic fillers may be used individually or as a mixture thereof. The total amount of the filler may be from about 0.5 to about 30 percent by weight of the polyurethane components.

Flame retardants may also be used to improve the flame resistance of the thermoplastic polyurethane. Suitable flame retardants may include organic phosphates, metal phosphates, metal polyphosphates, metal oxides (such as aluminum oxide hydrate, antimony trioxide, arsenic oxide), metal salts (such as calcium sulfate, expandable graphite), and cyanuric acid derivatives (such as melamine cyanurate). These flame retardants may be used individually or as a mixture thereof, and the total amount of the flame retardant may be from about 10 to about 35 percent by weight of the polyurethane components.

To improve toughness and compression rebound, the cross-linked thermoplastic polyurethane elastomer may include at least one dispersant, such as a monomer or oligomer comprising unsaturated bonds. Examples of suitable monomers include styrene, acrylic esters; suitable oligomers include di- and tri-acrylates/methacrylates, ester acrylates/methacrylates, and urethane or urea acrylates/methacrylates.

The polyurethane elastomer also may include at least one white pigment to aid in better visibility. The white pigment may be selected from the group consisting of titanium dioxide, zinc oxide, and a mixture thereof. Pigments of other colors may serve equally well, particularly in other articles, such as sports balls or livestock tags, for color-coding the articles, to increase visibility, or to increase the legibility of text printed thereon. With the guidance provided herein, the skilled practitioner can identify suitable additives.

For any ball layer(s) other than the outer cover layer, suitable materials can be selected from any of the various materials known to be used in golf ball manufacturing. Specifically, such other materials may be selected from the following groups: (1) thermoplastic materials selected from the group consisting of ionomer resin, highly neutralized acid polymer composition, polyamide resin, polyester resin, polyurethane resin and a mixture thereof; or (2) thermoset materials selected from the group consisting of polyurethane elastomer, polyamide elastomer, polyurea elastomer, diene-containing polymer (such as polybutadiene), cross-linked metallocene catalyzed polyolefin, silicone, and a mixture thereof.

For example, in embodiments where the core construction is multilayered, the choice of the material making up the inner core layer, such as inner core layer 140 (as shown in FIG. 1), is not particularly limited. The material making up the inner core layer may be selected from the following groups: (1) thermoplastic materials selected from the group consisting of ionomer resin, highly neutralized acid polymer composition, polyamide resin, polyester resin, polyurethane resin and a mixture thereof; or (2) thermoset materials selected from the group consisting of polyurethane elastomer, polyamide elastomer, polyurea elastomer, diene-containing polymer (such as polybutadiene), cross-linked metallocene catalyzed polyolefin, silicone, and a mixture thereof.

Among the various thermoplastic and thermoset materials, ionomer resin or highly neutralized acid polymer composition may comprise inner core layer in particular embodiments. For example, Surlyn®, HPF 1000, HPF 2000, HPF AD1027, HPF AD1035, HPF AD1040, and a mixture thereof, all produced by E. I. DuPont de Nemours and Company, may be used.

An inner core layer may be made by a fabrication method such as hot-press molding or injection molding. The diameter of the inner core layer may be in a range of about 10 millimeters to about 37 millimeters. The dimensions of layers and the properties and characteristics of those layers may be different.

In certain embodiments, if the inner core layer is made from a thermoplastic material, then the outer core layer, such as 130 of FIG. 1, typically may be made from a thermoset material. In particular, the outer core layer may comprise polyurethane elastomer, polyamide elastomer, polyurea elastomer, diene-containing polymer (such as polybutadiene), cross-linked metallocene catalyzed polyolefin, silicone, and a mixture thereof. In particular embodiments, the outer core layer may comprise polybutadiene.

In particular embodiments, a core layer typically may comprise 1,4-cis-polybutadiene in order to achieve superior resiliency performance. Specifically, 1,4-cis-polybutadiene may be used as a base material for an outer core layer, and mixed with other ingredients. Generally, however, 1,4-cis-polybutadiene may be at least 50 parts by weight, based on 100 parts by weight of the composition of the outer core layer.

Other additives, such as a cross-linking agent and a filler with a greater specific gravity typically may further be added to the composition of the outer core layer. Cross-linking agents may be selected from the group consisting of zinc diacrylate, magnesium acrylate, zinc methacrylate, and magnesium methacrylate. In particular embodiments, zinc acrylate may be used in order to achieve increased resilience.

To increase specific gravity, a suitable filler may be added in the rubber composition of the core layer. The filler may be zinc oxide, barium sulfate, calcium carbonate, and magnesium carbonate. Other fillers, such as a metal powder with a greater specific gravity, such as tungsten, may also be used. By means of adjusting the amount of filler, the specific gravity of the outer core layer may be controlled. The outer core layer also may have a surface Shore D hardness of 30 to 75.

Alternatively, the inner core layer typically may comprise the aforementioned thermoset material while the outer core layer typically may comprise the thermoplastic material, or any combination thereof. For example, inner core layer 140 may comprise a highly neutralized acid polymer composition. The suitable highly neutralized acid polymer composition includes HPF resins such as HPF1000, HPF2000, HPF AD1027, HPF AD1035, HPF AD1040, all produced by E. I. DuPont de Nemours and Company.

Suitable highly neutralized acid polymer compositions for use in forming inner core layer 140 may comprise a highly neutralized acid polymer composition and optionally additives, fillers, and/or melt flow modifiers. The acid polymer is neutralized to 70% or higher, including up to 100%, with a suitable cation source, such as magnesium, sodium, zinc, or potassium.

Suitable additives and fillers include, for example, blowing and foaming agents, optical brighteners, coloring agents, fluorescent agents, whitening agents, UV absorbers, light stabilizers, defoaming agents, processing aids, mica, talc, nanofillers, antioxidants, stabilizers, softening agents, fragrance components, plasticizers, impact modifiers, acid copolymer wax, surfactants; inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate, and the like; high specific gravity metal powder fillers, such as tungsten powder, molybdenum powder, and the like; regrind, i.e., inner core material that is ground and recycled; and nanofillers. Suitable melt flow modifiers include, for example, fatty acids and salts thereof, polyamides, polyesters, polyacrylates, polyurethanes, polyethers, polyureas, polyhydric alcohols, and combinations thereof.

Inner core layer 140 typically may be made by a fabrication method such as hot-press molding or injection molding. In embodiments, the diameter of inner core layer 140 may be in a range of about 19 millimeters to about 30 millimeters. To protect thermoplastic inner core layer 140 during a core-forming process, outer core layer 130 typically has a thickness of from about 5 millimeters to about 8 millimeters and has a volume which is greater than any other layers of golf ball 100.

The material making up outer core layer 130 typically may be thermoset materials selected from the group consisting of polyurethane elastomer, polyamide elastomer, polyurea elastomer, diene-containing polymer (such as polybutadiene), cross-linked metallocene catalyzed polyolefin, silicone, and a mixture thereof. Outer core layer 130 typically may be made by cross-linking a polybutadiene rubber composition. When other rubber is used in combination with a polybutadiene, it is typical that polybutadiene is included as a principal component. Specifically, a proportion of polybutadiene in the entire base rubber is typically equal to or greater than about 50 percent by weight, and particularly typically equal to or greater than about 80 percent by weight. A polybutadiene having a proportion of cis-1,4 bonds of equal to or greater than about 60 mol percent, and further, equal to or greater than about 80 mol percent, is typical.

Cis-1,4-polybutadiene may be used as the base rubber and mixed with other ingredients. The amount of cis-1,4-polybutadiene typically may be at least about 50 parts by weight, based on 100 parts by weight of the rubber compound. Various additives may be added to the base rubber to form a compound. The additives may include a cross-linking agent and a filler. The cross-linking agent typically may be zinc diacrylate, magnesium acrylate, zinc methacrylate, or magnesium methacrylate. In some embodiments, zinc diacrylate may provide advantageous resilience properties. The filler may be used to increase the specific gravity of the material. The filler may include zinc oxide, barium sulfate, calcium carbonate, or magnesium carbonate. In some embodiments, zinc oxide may be selected for its advantageous properties. Metal powder, such as tungsten, may alternatively be used as a filler to achieve a desired specific gravity.

Often, a polybutadiene synthesized using a rare earth element catalyst typically is used. By using this polybutadiene, excellent resilience performance of golf ball 100 can be achieved. Examples of rare earth element catalysts include lanthanum series rare earth element compound, organoaluminum compound, and alumoxane and halogen containing compound. A lanthanum series rare earth element compound is typical. Polybutadiene obtained by using lanthanum rare earth-based catalysts usually employ a combination of lanthanum rare earth (atomic number of 57 to 71) compounds, but particularly typical is a neodymium compound.

Outer core layer 130 typically is made by a hot-press molding process. Suitable vulcanization conditions include a vulcanization temperature of between 130° C. and 190° C. and a vulcanization time of between 5 and 20 minutes. To obtain the desired rubber cross-linked body for use as the core in the present invention, the vulcanizing temperature typically is at least 140° C.

When outer core layer 130 of the present invention is produced by vulcanizing and curing the rubber composition in the above-described way, advantageous use may be made of a method in which the vulcanization step is divided into two stages. The outer core layer material is placed in an outer core layer-forming mold and subjected to initial vulcanization so as to produce a pair of semi-vulcanized hemispherical cups, and then a prefabricated inner core layer is placed in one of the hemispherical cups and is covered by the other hemispherical cup, in which state complete vulcanization is carried out.

The surface of inner core layer 140 placed in the hemispherical cups may be roughened before the placement to increase adhesion between inner core layer 140 and outer core layer 130. In some embodiments, inner core layer surface is pre-coated with an adhesive or pre-treated with chemical(s) before placing inner core layer 140 in the hemispherical cups to enhance the durability of the golf ball and enable a high rebound.

Inner cover layer 120 of the golf ball described herein may comprise a thermoplastic material. The thermoplastic material of inner cover layer 120 typically comprises at least one of an ionomer resin, a highly neutralized acid polymer composition, a polyamide resin, a polyurethane resin, a polyester resin, or a combination thereof. In some embodiments, inner cover layer 120 comprises the same type of cross-linked thermoplastic polyurethane as outer cover layer 110. The inner cover layer 120 also may comprise a cross-linked thermoplastic polyurethane composition. For example, in some embodiments, inner cover layer 120 may comprise a cross-linked but not over-indexed polyurethane, or may comprise yet another uncross-linked thermoplastic polyurethane different from outer cover layer 110, while in some embodiments, inner cover layer 120 comprises a different material from outer cover layer 110.

Inner cover layer 120 typically has a thickness of less than about 2 millimeters. In some embodiments, inner cover layer 120 of the present invention has a thickness of less than about 1.5 millimeters. In some embodiments, inner cover layer 120 of the present invention has a thickness of less than about 1 millimeter. Although inner cover layer 120 is relatively thin compared to the rest of the layers of golf ball 100, it typically has the highest surface Shore D hardness among all layers.

In accordance with the method disclosed herein, a solution of polyurethane in a suitable solvent is made by mixing polyurethane reactants in a solvent, which also serves as a penetrating agent. The solvent should be appropriate for all reactants (long chain polyol, relatively short chain extender, isocyanate) and the resultant polyurethane product. Typical solvents include ethyl acetate, butyl acetate, acetone, methyl ethyl ketone, and methyl isobutyl ketone. With the guidance provided herein, the skilled practitioner will be able to select a suitable solvent.

Reactants also can be introduced in combinations, such as combinations of the long chain polyol and the relatively short chain extender. Such products are available in many formats. One commercially-available family of products is the Desmophen® products available from Bayer MaterialScience. These products are polyester resins, typically supplied in a solvent.

One such product known to be suitable in the method disclosed herein is Desmophen® 631 MPA. This product is a saturated polyester resin supplied in propylene glycol monomethyl ether acetate (PMA). This product comprises about 75 wt percent solids and has an equivalent weight of about 267.

Similarly, the isocyanate component can be a combination of isocyanate-containing compounds. Various products are commercially available. One such product known to be suitable in the method disclosed herein in Mondur MR Light, an aromatic polymeric isocyanate based on diphenylmethane diisocyanate, available from Bayer MaterialScience. The product is 100 wt percent solids and has an equivalent weight of about 132. In particular, this produce comprises between about 40 wt percent and about 55 wt percent polymeric diphenylmethane diisocyanate (pMDI), between about 35 wt percent and about 45 wt percent 4,4'-diphenylmethane diisocyanate (MDI), and between about 1 wt percent and about 5 wt percent diphenylmethane diisocyanate (MDI) mixed isomers.

Another suitable commercially-available product is Tolonate® HDB-LV, an aliphatic polyisocyanate based on HDI biuret. This product is 100 wt percent solids and has an equivalent weight of about 179. This product is an HDI homopolymer that contains less than about 0.3 wt percent HDI monomer. Tolonate® HDB-LV is available from Perstorp.

The skilled practitioner recognizes that other materials of these types, for example, the same compounds but in different proportions, or different compounds having the same functional moieties thereon, but having different equivalent weights, also are suitable for use within this disclosure. With the guidance provided herein, the skilled practitioner will be able to identify suitable products for use in accordance with this disclosure.

In accordance with embodiments of the disclosure, a penetrating agent also is present in the solution. The penetrating agent swells the TPU substrate, making it amenable to receive the polyurethane solution. Thus, the TPU substrate becomes infused with the polyurethane. Typically, such penetrating agents are selected from the group consisting of the solvents for TPU, including ethyl acetate, butyl acetate, acetone, methyl ethyl ketone, and methyl isobutyl ketone. With the guidance provided herein, the skilled practitioner will be able to select a suitable penetrating agent. Acetone is a particularly useful penetrating agent.

The skilled practitioner also recognizes that catalyst or reaction promoter also may be present in the solution. Typical urethane catalysts can be used. Particularly, an organometallic compound, and most typically dibutyltin dilaurate, is used. One such dibutyltin dilaurate catalyst is commercially available under the tradename Dabco® T-12, available from Air Products and Chemicals, Inc. Catalyst concentrations typically are less than about 100 ppm.

The concentration of polyurethane solids in the solution, including the penetrating agent, is between about 1 wt percent and about 50 wt percent, typically between about 4 wt percent and about 25 wt percent, and more typically between about 6 wt percent and about 20 wt percent. These concentrations provide an opportunity for the TPU to swell in the presence of the penetrating agent, and then for the polyurethane in the solution to interact with the TPU. Although the inventors do not wish to be bound by theory, the polyurethane in solution can react with the TPU and become bound thereto, whether by cross-linking or by some other mechanism, such as by forming an interpenetrating polymer network.

The solution can be applied to the surface in any suitable manner to achieve essentially complete coverage of the TPU surface, including dipping, painting, and spraying. Painting and spraying are known to the skilled practitioner, as is a dipping process. However, the inventor has discovered that a lower concentration of the thermoset polyurethane in a dipping solution in an appropriate solvent provides for the opportunity for a dwell time sufficient to swell the TPU. Swelling of the TPU allows the yet-uncured polyurethane into the TPU cover. The selection of an appropriate solvent also ensures that the dwell time is not so long that the TPU cover swells too much, thus ruining the golf ball. The skilled practitioner recognizes that each of these methods has advantages and disadvantages. The inventors have discovered that dipping is quick and efficient. Typically, articles having a TPU surface to be toughened in accordance with embodiments of the disclosure are dipped into polyurethane solution for between about 30 seconds and about 10 minutes, more typically between about 1 minute and about 5 minutes.

After the solution is applied and dried, it is cured, typically in a heated oven, for a period sufficient to cause the polyurethane to form an interpenetrating network with the TPU and to toughen the surface thereof. The suitable period typically is between about 10 minutes to about 3 hours, and more typically between about 1 and about 2 hours, at a temperature of between about 80° F. and about 300° F., more typically between about 150° F. and about 200° F.

Figure 2:
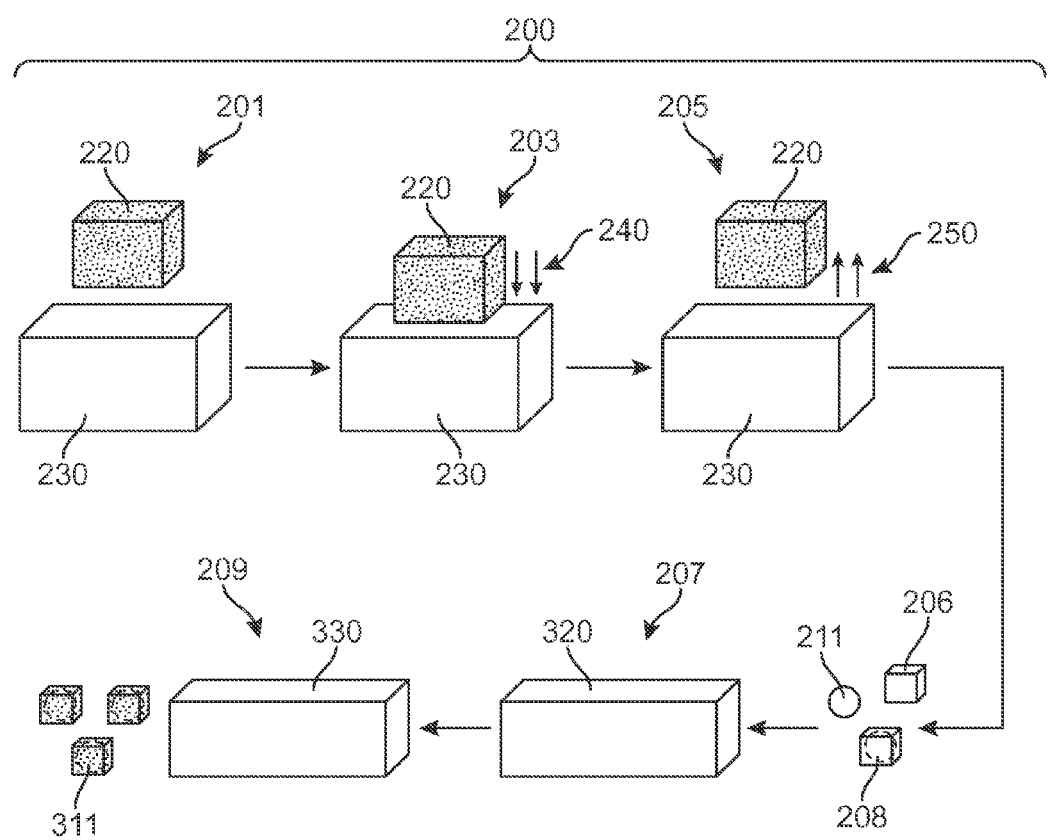
FIG. 2 illustrates a typical schematic flow diagram for the manufacture of toughened thermoplastic polyurethane articles.

FIG. 2 illustrates method 200 of the disclosure schematically. Throughout these figures, like numbers are intended to mean like features. In step 201, articles to be treated are placed in basket or sieve 220, which is any container that will retain the articles therein and will afford the liquid polyurethane solution the opportunity to flow smoothly onto and immerse the articles during the dip treatment. Polyurethane solution is prepared and introduced into tank or vat 230. Alternatively, the polyurethane solution can be prepared in tank or vat 230.

Basket 220, with articles to be treated therein, is introduced into polyurethane solution (not shown here) in vat 230 at dip step 203 by lowering vat 220 in the direction of arrows 240. Basket 220, with articles for treatment therein, remains in vat 230 in dip step 203 for a period sufficient to swell the TPU outer layer, such as outer cover layer 110, and infuse sufficient polyurethane into the TPU to toughen the TPU surface upon curing.

At the end of the submersion time at dip step 203, basket 220 containing the articles being treated is moved in the direction of arrows 250 and removed from vat 230 at drip step 205. The articles are allowed to dry for about 1 minute and then are removed from basket 220 and placed essentially singly into individual containers 206. Individual containers 206 containing an article/golf ball 211 are identified by reference numeral 208 ensure that articles/golf balls 211 do not fuse together during oven drying and curing.

Containers 206 with articles 211 within (208) are placed on a continuous belt (not shown here) and moved into oven 320 for drying in drying step 207. This dryer can be a continuous belt dryer, which transports articles under conditions that dry and cure the articles to form the toughened thermoplastic polyurethane. Then, in cooling step 209, cured articles in individual containers 311 are moved on the continuous belt (not shown here) to cooling area 330 and cooled for about 20 minutes. Cured articles, such as golf balls, in containers 311 are removed from cooling area 330.

The polyurethane solution also may contain additives typically found in a golf ball cover. For example, the solution may contain stabilizers for the infused polyurethane, such as antioxidants, dyes, optical brighteners, UV absorbers, and UV stabilizers.

After curing in heated dryer/oven 320 and cooling in cooling area 330, the golf balls can be further processed to incorporate one or more coatings and indicia. These coatings and indicia may be pigmented or non-pigmented. Further, the solution may include UV stabilizers, such as benzophones and hindered amines. The solution also may contain other additives to stabilize the material. These materials will solidify and remain on the surface.

Figure 3:
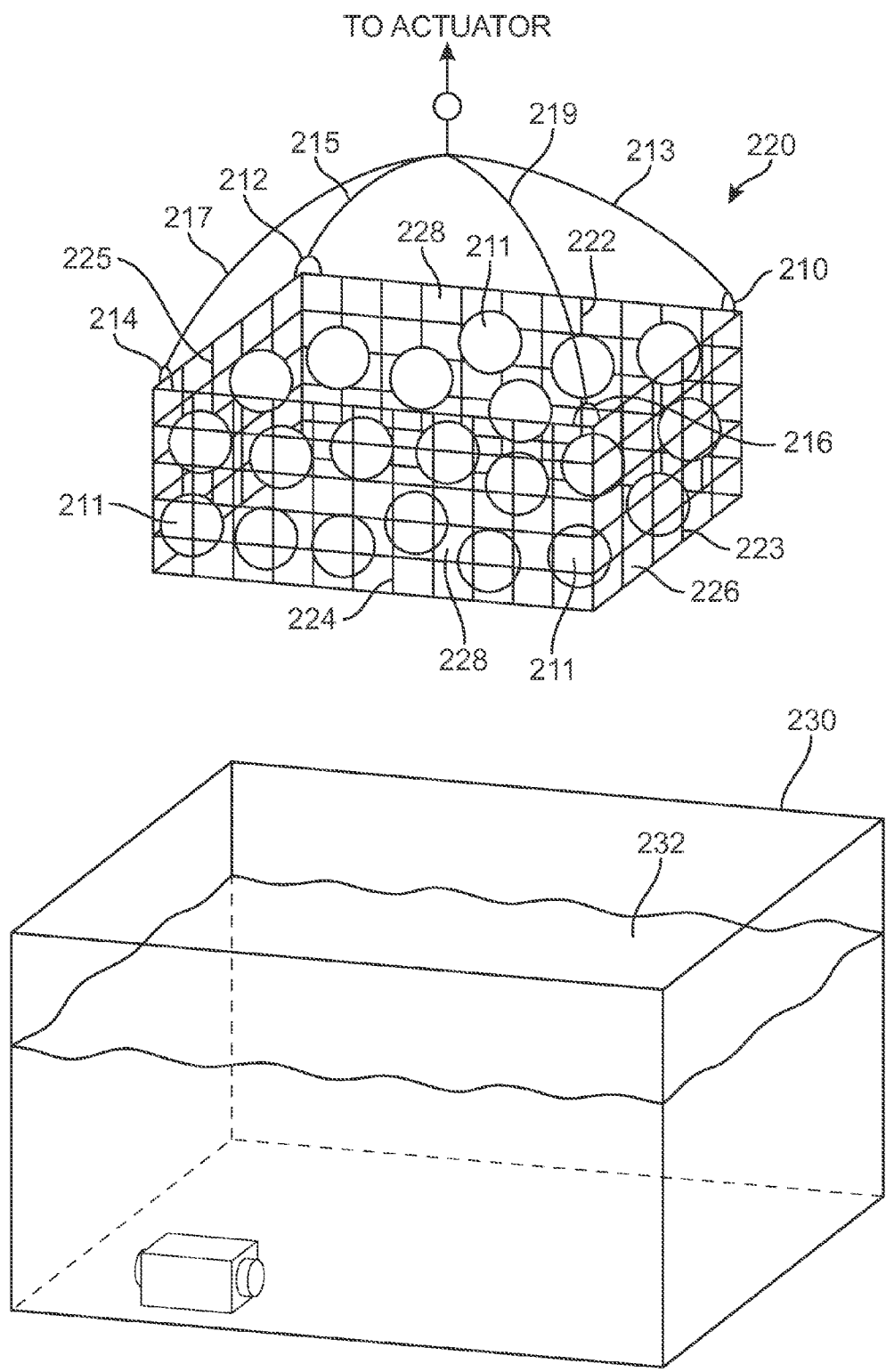
FIG. 3 illustrates a process step in the manufacture of toughened thermoplastic polyurethane articles.

The process steps are illustrated in detail in FIGS. 3-7. FIG. 3 illustrates process step 201. Basket 220 comprising first basket wall 222, second basket wall 223, third basket wall 224, fourth basket wall 225, and basket bottom 226 is movably suspended from an actuator (not shown). Basket 220 is suspended from the actuator by first handle 213, second handle 215, third handle 217, and fourth handle 219. The handles are attached to the basket by first connector 210, second connector 212, third connector 214, and fourth connector 216.

Basket 220 is made so that fluid can flow freely into and out of the basket. Therefore, basket walls 222, 223, 224, and 225, and basket bottom 226 include holes 228. Holes 228 are smaller than the articles being treated; golf balls are illustrated as 211 herein. Holes 228 may be perforations in an otherwise solid sheet, or the walls and the bottom may comprise wire, or any combination thereof. With the guidance provided herein, the skilled practitioner will be able to fashion a suitable basket. Basket 220 is suspended by an actuator (not shown) so that it can be placed into tank 230 containing polyurethane solution 232.

Figure 4:
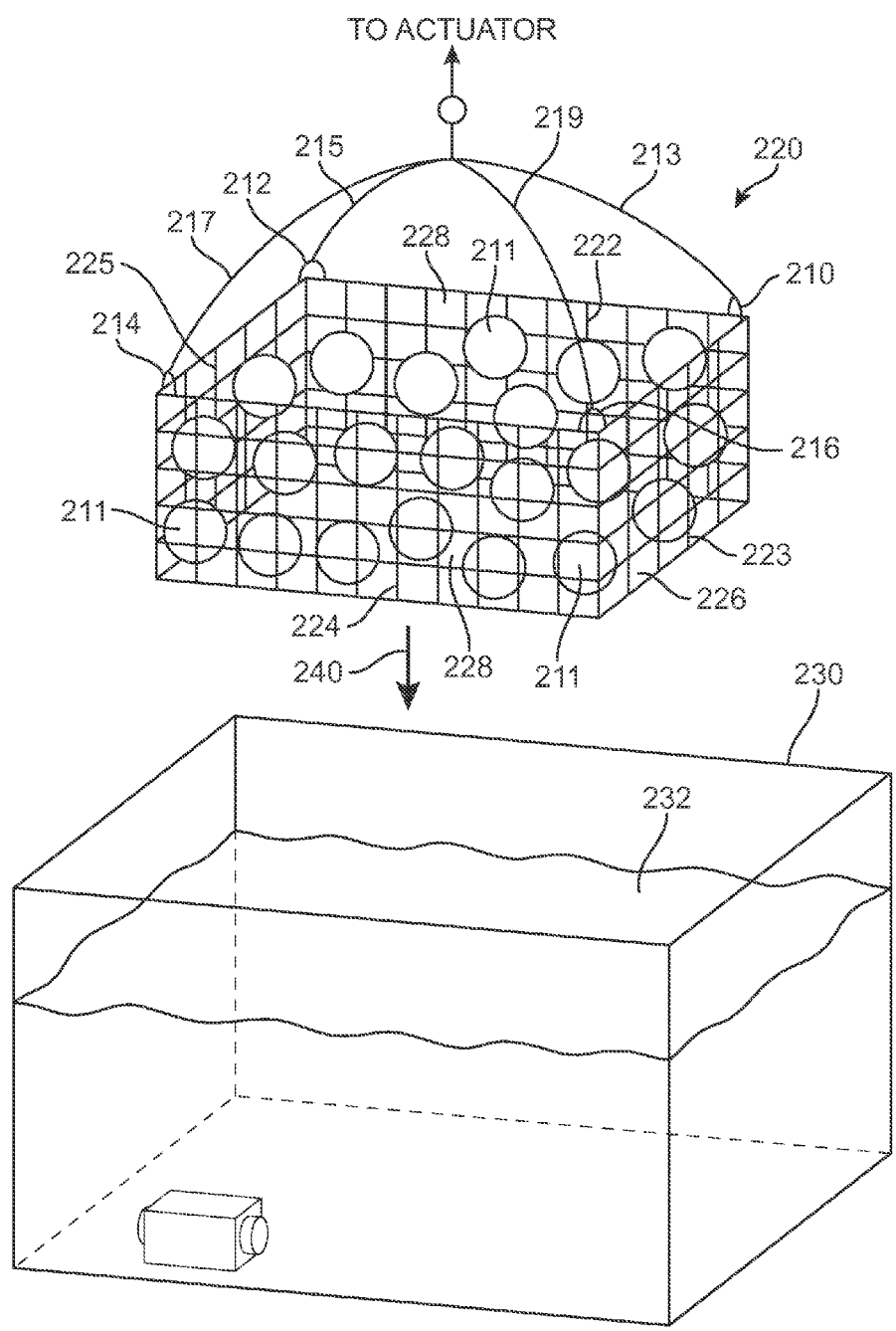
FIG. 4 illustrates another process step in the manufacture of toughened thermoplastic polyurethane articles.

FIG. 4 illustrates details of process step 203. In process step 203, basket 220 is moved by an actuator (not shown here) in the direction of arrow 240 to lower basket 220 into solution 232 in tank 230. Each of the walls, bottom, handles, holes, golf balls, handles, and connectors is illustrated in FIG. 4.

Figure 5:
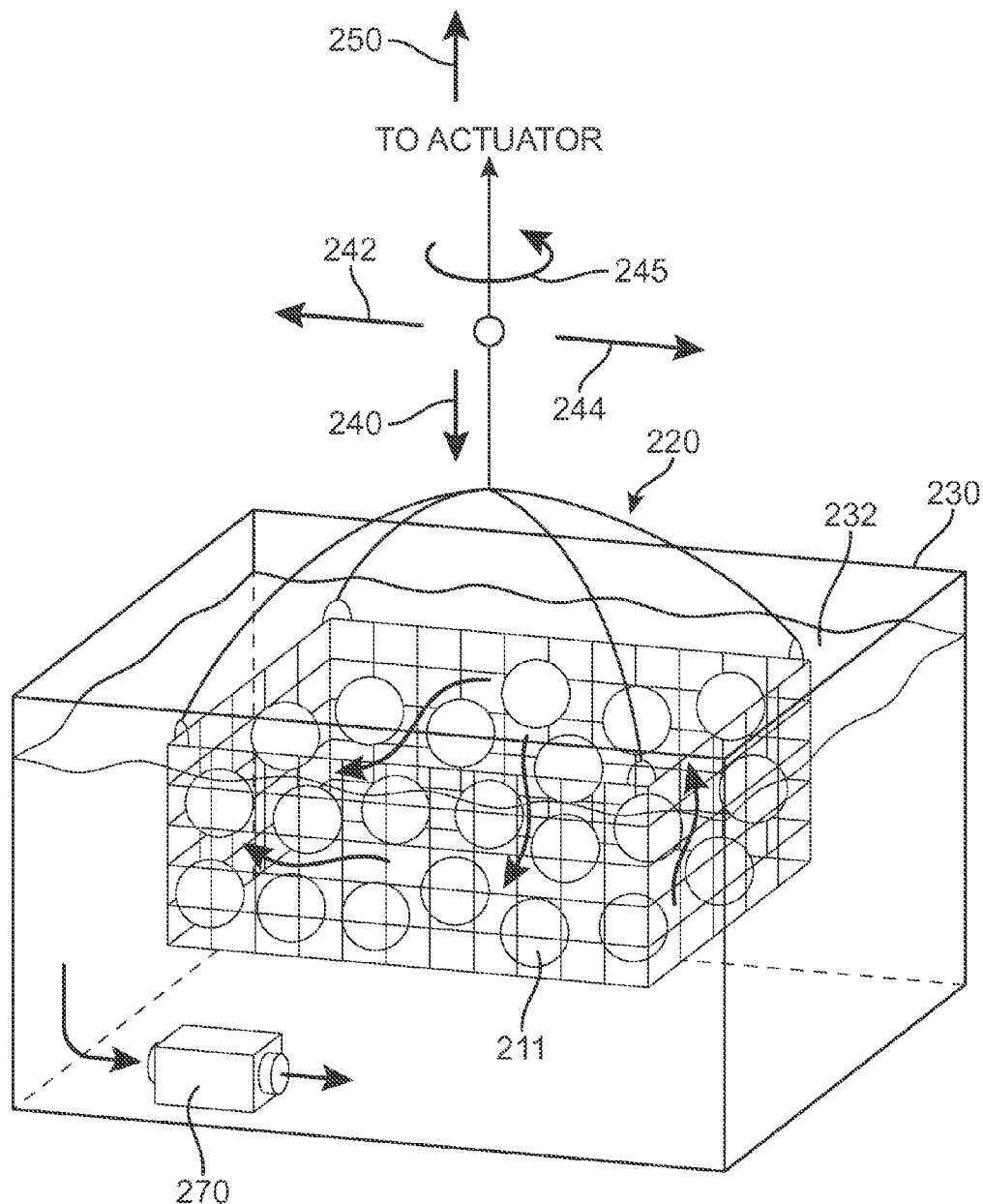
FIG. 5 illustrates yet another process step in the manufacture of toughened thermoplastic polyurethane articles.

FIG. 5 illustrates that basket 220 is submerged into solution 232 in vat 230. Basket 220 is lowered to a point at which each of the articles/golf balls 211 is completely submerged into solution 232. Basket 220, together with all of the handles, connectors, walls, bottom, holes, and golf balls therein, are moved in the direction of arrow 240 into the vat by an actuator (not shown here). To ensure that each of the articles 211, shown here as golf balls, is completely covered with solution and that articles 211 have not adhered to each other or basket 220 so as to preclude complete solution coverage, basket 220 can be moved in a first translation direction 242, a second translation direction 244, or in a rotational direction 245. Further, pump 270 can move solution 232 and create shear in tank 230, causing mixing and motion of solution 232 sufficient to ensure that each article/golf ball 211 is covered with solution 232.

Figure 6:
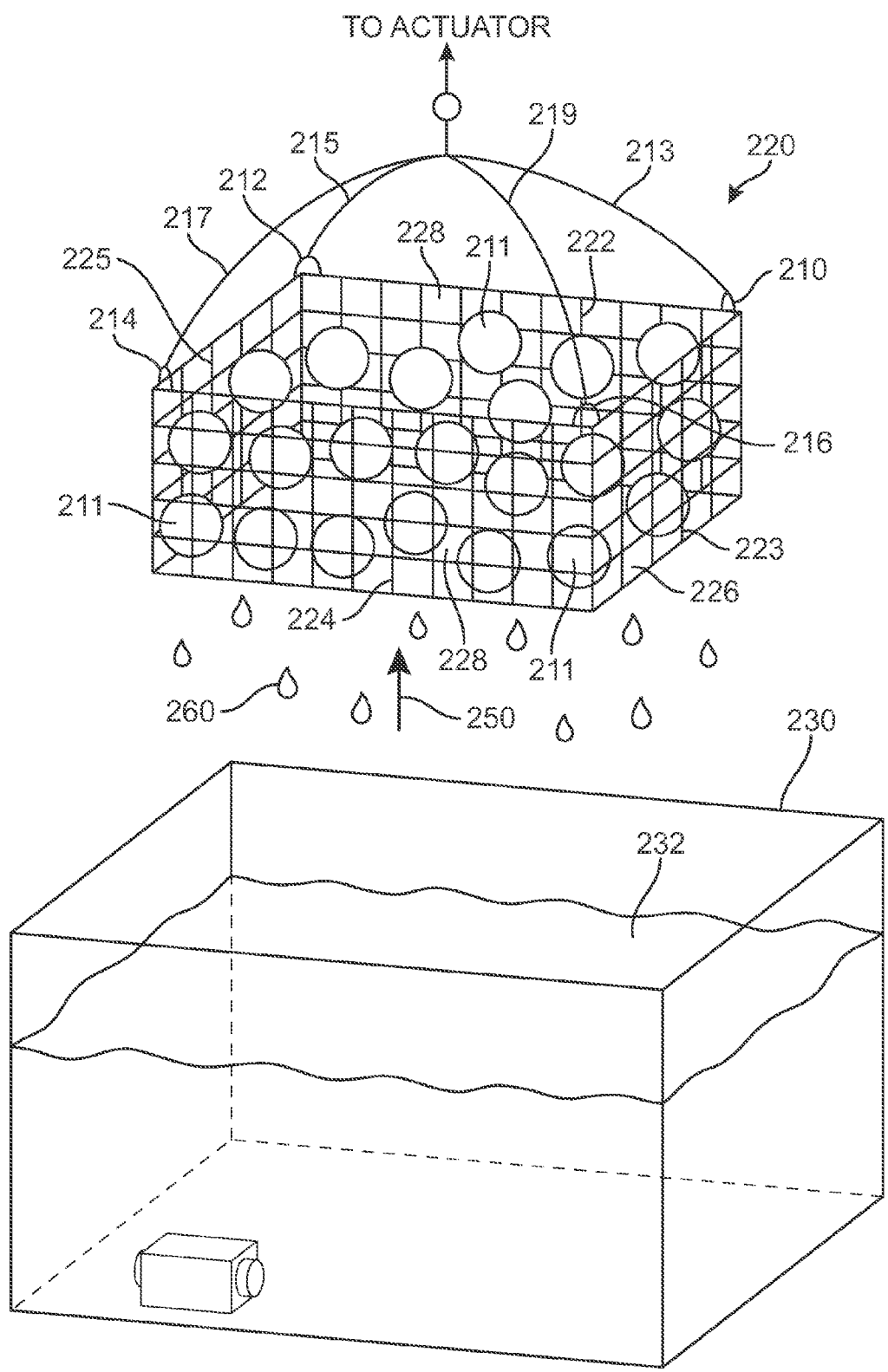
FIG. 6 illustrates still another process step in the manufacture of toughened thermoplastic polyurethane articles.

FIG. 6 illustrates in detail process step 205. After a period sufficient to ensure that each article/golf ball 211 is covered with solution 232, basket 220, together with all of the handles, connectors, walls, bottom, holes, and articles/golf balls 211 therein, is moved by an actuator (not shown here) in the direction of arrow 250 and suspended above tank 230. Basket 220 is suspended for a time sufficient for excess solution 260 to drain from golf balls/articles 211 and basket 220 and into tank 230.

Figure 7:
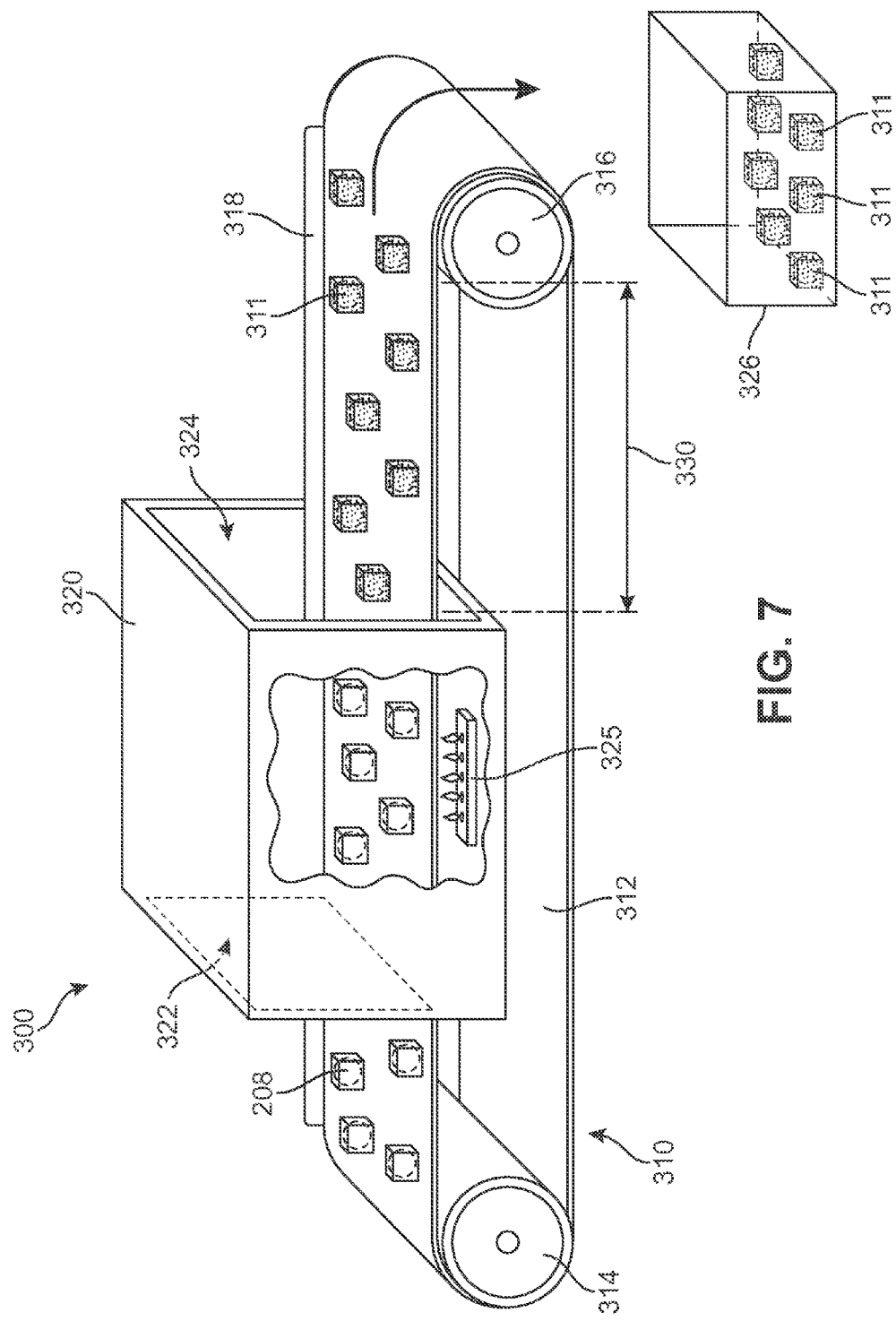
FIG. 7 illustrates the last process steps in the manufacture of toughened thermoplastic polyurethane articles.

FIG. 7 illustrates in detail process steps 207 and 209. Curing/drying system 300 comprises heated dryer 320 and cooling area 330, with continuous belt 310 carrying single articles/golf balls in individual containers 208 to and through oven 320, cooling area 330, and to container 326 for cured articles/golf balls in containers 311.

Articles/golf balls 211 are placed into single containers 206, reference numeral 208, and are delivered to continuous belt 310. Continuous belt 310 comprises belt 312 traversing over first drum 314 and second drum 316 to carry individual containers through oven 320 and cooling area 330. Oven 320 has an entry opening 322 and an exit opening 324 through which belt 312 traverses to carry containers 208 through the oven volume heated by heat source 325. Continuous belt 310 may have a side wall or fender 318 on one or both (not illustrated here) sides to ensure that containers 208 are retained on belt 312.

Single cured, dried articles/golf balls in individual containers 311 are moved on belt 312 out of oven 320 through exit opening 324. Containers 311 enter cooling area 330, illustrated here as a length of belt 312. However, the skilled practitioner recognizes that cooling area 330 also may comprise a controlled-temperature tunnel or other enclosure that captures the heat removed from dried articles/golf balls in containers 311. With the guidance provided herein, the skilled practitioner can select an appropriate cooling area. When containers containing cured product 311 reach the end of cooling area 330, they are collected in collection container 326 for further processing.

The polyurethane solution also may contain additives typically found in a golf ball cover. For example, the solution may contain stabilizers for the infused polyurethane, such as antioxidants, dyes, optical brighteners, UV absorbers, and UV stabilizers.

After curing in oven 206 and cooling in cooling tunnel 207, the golf balls can be further processed to incorporate one or more coatings and indicia. These coatings and indicia may be pigmented or non-pigmented. Further, the solution may include UV stabilizers, such as benzophones and hindered amines. The solution also may contain other additives to stabilize the material. These materials will solidify and remain on the surface.

EXAMPLES

Example 1

Two sets of golf balls having tough cross-linked TPU covers were fabricated and tested for scuff resistance. The major relevant difference between the sets was the hardness of the cover. The first set of golf balls comprised a harder cover and the second set comprised a softer cover. Both covers were TPU compositions.

Three balls of each set were treated in accordance with the disclosure. The balls were dipped for four minutes in a solution of the following composition:

TABLE 1

| Compound | Amount, lbs | Solids, lbs |
| --- | --- | --- |
| Desmophen ® 631 MPA (Bayer) | 100 | 75 |
| Tolonate ® HDB-LV | 70.39 | 70.39 |
| Acetone | 2000 | 0 |
| Dabco ® T-12 | 0.05 | 0.05 |
| Total | 2170.44 | 145.44 |
| Wt percent solids | | 6.70 |
| Index | | 1.05 |

After the four-minute dip period, the golf balls then were removed from the solution and placed in a heated oven at about 150° F. for about 15 minutes.

A scuff resistance test was conducted in the following manner: a Nike Victory Red forged standard sand wedge (loft: 54°; bounce: 12°; shaft: True Temper Dynamic Gold shaft; flex: S) is fixed to a swing robot manufactured by Miyamae Co., Ltd. and then swung at the head speed of about 32 m/s. The club face was oriented for a square hit. The forward/backward tee position was adjusted so that the tee was four inches behind the point in the downswing where the club was vertical. The height of the tee and the toe-heel position of the club relative to the tee were adjusted in order that the center of the impact mark was about ¾ of an inch above the sole and was centered toe to heel across the face.

After the above described scuff resistance testing, each golf ball cover was visually observed and rated according to the following scale: a golf ball was rated less than "1" when very few groove markings or dents were visible: a golf ball cover was rated "1" when little or no damage was visible, only groove markings or dents; a golf ball cover was rated "2" when small cuts and/or ripples in the cover were apparent; a golf ball cover was rated "3" when moderate amounts of cover material were lifted from the ball's surface, but the cover material was still attached to the ball; and finally a golf ball cover was rated "4" when cover material was removed or barely attached to the golf ball.

Other methods may also be used to determine the scuff resistance, such as the methods described in the commonly assigned copending application titled "Golf Ball Wear Indicator", U.S. Patent and Trademark Office Ser. No. 12/691,282, filed Jan. 21, 2010 in the name of Brad Tutmark.

As shown in Table 2, the 'harder' and 'softer' golf ball examples for each set illustrate that the treated version of the golf ball in question shows less damage than the corresponding untreated version of the golf ball, as follows:

TABLE 2

|  |  | Ball Number | | | |
|---|---|---|---|---|---|
|  |  | 1 | 2 | 3 | Avg. |
| Harder cover rating | Untreated | 1.8 | 1.1 | 1.4 | 1.4 |
|  | Treated | 1.4 | 1.0 | 1.3 | 1.2 |
| Softer cover rating | Untreated | 0.3 | 0.2 | 0.4 | 0.3 |
|  | Treated | 0.1 | 0.1 | 0.3 | 0.2 |

As can be seen, the golf balls treated in accordance with the embodiments of the disclosure are more resistant to scuffing during testing.

Comparative Examples

One set of 3-piece golf balls having an ionomeric cover and one set of 3-piece golf balls having a higher hardness polyurethane cover were fabricated and tested for scuff resistance.

Three of each set of golf balls were subjected to the same scuff resistance test carried out in Example 1. The golf balls were evaluated on the same scale as used in Example 1.

As shown in Table 3, the comparative golf ball examples for each set illustrate that the golf balls of Example 1 in question show significantly less damage than the comparative golf balls, as follows:

TABLE 3

|  |  | Ball Number | | | |
|---|---|---|---|---|---|
|  |  | 1 | 2 | 3 | Avg. |
| Example 1 | | | | | |
| Harder cover rating | Untreated | 1.8 | 1.1 | 1.4 | 1.4 |
|  | Treated | 1.4 | 1.0 | 1.3 | 1.2 |

TABLE 3-continued

|  |  | Ball Number | | | |
|---|---|---|---|---|---|
|  |  | 1 | 2 | 3 | Avg. |
| Softer cover rating | Untreated | 0.3 | 0.2 | 0.4 | 0.3 |
|  | Treated | 0.1 | 0.1 | 0.3 | 0.2 |
| Comparative Examples | | | | | |
| Ionomeric cover |  | 3.4 | 3.1 | 3.4 | 3.3 |
| Higher hardness polyurethane cover |  | 2.3 | 2.3 | 2.4 | 2.3 |

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims. For example, different golf ball cover layer polyurethane compositions also fall within the scope of the claims.

We claim:

1. A method for toughening a thermoplastic polyurethane (TPU) surface, the method comprising:
   A. immersing the TPU surface into a polyurethane solution comprising a penetrating agent selected from the group consisting of solvents for TPU, wherein the polyurethane solution includes a polyurethane prepared from reactants comprising at least one polyester polyol and at least one isocyanate, and a catalyst, wherein the polyurethane solution has a solids concentration of between about 6 wt percent and about 20 wt percent and wherein the TPU surface is immersed for a time sufficient to swell the TPU surface and allow some of the polyurethane solution to enter the TPU surface;
   B. drying the surface to evaporate the solvent; and
   C. curing the polyurethane to form an interpenetrating polymer network with the TPU and form a toughened TPU surface.

2. The method of claim 1 wherein the penetrating agent is acetone.

3. The method of claim 1 wherein the penetrating agent is methyl ethyl ketone.

4. A golf ball having a toughened TPU surface prepared by the method of claim 1.

5. A golf ball according to claim 4, wherein the isocyanate comprises a member selected from the group consisting of polymeric diphenylmethane diisocyanates, HDI homopolymers, and combinations thereof.

* * * * *